United States Patent
Schlenker

(10) Patent No.: US 10,900,473 B2
(45) Date of Patent: Jan. 26, 2021

(54) CONVEYING DEVICE FOR CONVEYING A FLOWABLE MEDIUM

(71) Applicant: Pressol-Schmiergerate Gesellschaft mit beschrankter Haftung, Umkirch (DE)

(72) Inventor: Rudolf Schlenker, Immensee (CH)

(73) Assignee: Pressol-Schmiergeräte Gesellschaft mit beschränkter Haftung, Umkirch (DE)

( * ) Notice: Subject to any disclaimer, the term of this patent is extended or adjusted under 35 U.S.C. 154(b) by 207 days.

(21) Appl. No.: 15/441,681

(22) Filed: Feb. 24, 2017

(65) Prior Publication Data
US 2017/0248136 A1    Aug. 31, 2017

(30) Foreign Application Priority Data

Feb. 25, 2016  (DE) .................... 10 2016 002 263

(51) Int. Cl.
| | |
|---|---|
| *F04B 9/129* | (2006.01) |
| *F04B 9/133* | (2006.01) |
| *F04B 53/12* | (2006.01) |
| *F04B 23/06* | (2006.01) |
| *F16K 15/04* | (2006.01) |

(52) U.S. Cl.
CPC ............ *F04B 9/1295* (2013.01); *F04B 9/133* (2013.01); *F04B 23/06* (2013.01); *F04B 53/12* (2013.01); *F04B 53/126* (2013.01); *F16K 15/048* (2013.01)

(58) Field of Classification Search
CPC ........ F04B 9/129; F04B 9/1295; F04B 9/131; F04B 9/133; F04B 53/125; F04B 53/126; F04B 9/1315; F04B 9/135; F04B 23/04; F04B 23/06; F04B 53/005; F04B 53/12–129; F04B 15/04–048
USPC ......................................... 417/497, 520, 554
See application file for complete search history.

(56) References Cited

U.S. PATENT DOCUMENTS

| | | | | |
|---|---|---|---|---|
| 875,372 | A | * 12/1907 | Palm | ...................... F04B 53/126 166/243 |
| 1,418,043 | A | * 5/1922 | Wilcox | ................... F04B 53/10 137/533.13 |
| 1,941,140 | A | 12/1933 | Dodge | |
| 2,221,763 | A | 11/1940 | Ginter | |

(Continued)

FOREIGN PATENT DOCUMENTS

| | | |
|---|---|---|
| CH | 699509 | 3/2010 |
| DE | 2214652 | 10/1972 |

(Continued)

*Primary Examiner* — Bryan M Lettman
(74) *Attorney, Agent, or Firm* — Volpe Koenig

(57) ABSTRACT

A delivery device for delivering a fluid medium having a delivery drive, a pump device and a scoop device. The delivery drive is arranged at a first end of a pipe, and the pump device and the scoop device are arranged inside the pipe. The scoop device includes a foot valve, which is arranged at a second end of the pipe and controls an inlet for an inflow of medium into a piston chamber. A piston, which sub-divides the piston chamber into an inflow area and a discharge area, is arranged in the piston chamber. The inflow area and the discharge area are or can be connected via the piston, and the piston, via a piston rod, is movable between a retracted position and an extended position inside the piston chamber by the delivery drive.

12 Claims, 2 Drawing Sheets

(56) References Cited

U.S. PATENT DOCUMENTS

| | | | |
|---|---|---|---|
| 2,630,248 | A | 3/1953 | Hinz |
| 2,925,941 | A | 2/1960 | Bloxom |
| 2,997,215 | A | 8/1961 | Chinchole |
| 3,976,229 | A | 8/1976 | Jackson |
| 6,467,579 | B1 | 10/2002 | Simon |
| 7,137,792 | B2 | 11/2006 | Rosenauer et al. |
| 7,513,393 | B2 | 4/2009 | Kotyk |
| 7,762,428 | B2 | 7/2010 | Scheugenpflug |
| 8,251,066 | B1 * | 8/2012 | Ho .................. A61M 16/06 128/204.18 |
| 8,491,272 | B2 | 7/2013 | Takase |
| 2001/0025864 | A1 | 10/2001 | Meyer |
| 2004/0050961 | A1 * | 3/2004 | Rosenauer ............. F04B 5/00 239/302 |
| 2008/0023082 | A1 | 1/2008 | Schucker |
| 2014/0044567 | A1 * | 2/2014 | Bauck .................. F04B 53/12 417/53 |
| 2016/0016785 | A1 | 1/2016 | Tartler |

FOREIGN PATENT DOCUMENTS

| | | |
|---|---|---|
| DE | G8435373 | 4/1985 |
| DE | 3710172 | 10/1988 |
| DE | 19629644 | 1/1998 |
| DE | 19847031 | 4/1999 |
| DE | 20118154 | 3/2002 |
| DE | 10154681 | 5/2003 |
| DE | 10235140 | 2/2004 |
| DE | 102004030654 | 1/2006 |
| DE | 102007003972 | 7/2008 |
| DE | 102008014340 | 12/2009 |
| DE | 202013102871 | 9/2013 |
| DE | 202013004757 | 8/2014 |
| DE | 102013005965 | 10/2014 |
| DE | 102013103734 | 10/2014 |
| EP | 0943583 | 9/1999 |
| GB | 544666 | 4/1942 |
| GB | 1316077 | 5/1973 |
| WO | 9843012 | 10/1998 |

* cited by examiner

CONVEYING DEVICE FOR CONVEYING A FLOWABLE MEDIUM

BACKGROUND

The invention relates to a delivery device for delivering a fluid medium, having a delivery drive, a pump device, and a scoop device Such delivery devices are already known. They are often adapted to the delivery of a viscous medium, for example from a vessel in the form of a drum. The scoop devices of known delivery devices generally comprise a scoop, into which the medium to be delivered flows when the scoop is extended. The medium can then be conveyed to the pump device by a lifting device. One disadvantage of the known delivery device lies in the fact, for example, that a medium can be received by the scoop only when the level of the medium in the vessel is higher than the height of the edge of the scoop. Should the level of the medium drop to or below the edge of the scoop, known delivery devices are no longer capable of delivering the medium.

SUMMARY

The object of this invention, therefore, is to eliminate the aforesaid disadvantages of a delivery device of the aforementioned type.

This object is achieved by the combination of features according to the below described invention. In particular, the invention proposes to achieve this object by a delivery device of the aforementioned type in that the delivery drive is arranged at a first end of a pipe, wherein the pump device and the scoop device are arranged inside the pipe, that the scoop device comprises a foot valve, which is arranged at a second end of the pipe and which foot valve serves to control an inlet for an inflow of medium into a piston chamber, that a piston, which sub-divides the piston chamber into an inflow area and a discharge area, is arranged in the piston chamber, wherein the inflow area and the discharge area are or can be connected via the piston, and that the piston, via a piston rod, is movable between a retracted position and an extended position inside the piston chamber by the delivery drive. The delivery device according to the invention therefore allows virtually all of the fluid medium stored in a vessel to be delivered out of the vessel. In contrast to known delivery devices, the delivery device according to the invention therefore allows further delivery even when the medium to be delivered is at low levels.

It may be particularly expedient here for the scoop device to be connected upstream of the pump device in the inflow direction of the medium. The scoop device of the delivery device according to the invention therefore allows sufficient medium to be transported to the pump device, the pump device being able to generate a sufficiently high pressure for further delivery of the medium.

In a particularly advantageous embodiment of the delivery device according to the invention the piston of the scoop device and/or a pump piston of the pump device can be moved by the delivery drive via the piston rod. A relatively simple, synchronous operation of the scoop device and the pump device is thereby possible by the delivery drive.

According to a particularly advantageous embodiment of the delivery device according to the invention the piston may comprise a piston valve, by way of which piston valve the inflow area and the discharge area of the piston chamber are or can be connected. Here it may be particularly expedient for the piston valve to be embodied as a check valve.

The piston valve may preferably be embodied as a ball-type check valve. At the same time it may be particularly expedient for a ball to be held in a closed position by a return element, such as a spring, for example, wherein by exerting pressure on the ball, the ball can be moved into an open position against a return force of the return element. This means that the piston valve can therefore serve to define a direction of flow from the inflow area into the discharge area of the piston chamber, wherein in particular a backflow counter to the defined direction of flow is not possible or only a smaller volume is able to flow back counter to the defined direction of flow.

Furthermore, it may be expedient for the foot valve to be embodied as a check valve, thereby defining a direction of flow into the inflow area of the piston chamber. The foot valve embodied as a check valve can therefore serve to prevent an unwanted backflow of medium received into the piston chamber, for example into a vessel in which the medium is stored.

Particularly efficient delivery of the medium by the device according to the invention can be achieved if the latter is adapted in such a way that the foot valve is open or opened and fresh medium is drawn into the inflow area by the foot valve, and medium is forced out of the discharge area into the pump device, when the piston moves from the extended position to the retracted position. Alternatively or in addition to this, it may be expedient for the foot valve to be closed and for medium to be forced out of the inflow area into the discharge area, when the piston moves from the retracted position to the extended position.

A particularly advantageous embodiment of the delivery device according to the invention can be achieved in that the delivery drive is embodied as an oscillating drive, in particular as a pneumatic motor.

In order to be able to achieve an improved overall delivery capacity of the delivery device according to the invention per unit time, it may be expedient for a delivery capacity of the scoop device to be greater than a delivery capacity of the pump device. This can be arranged, for example, in that a volumetric capacity of the piston chamber of the scoop device is greater than a volumetric capacity of the pump chamber of the pump device.

In order to prevent overload due to the occurrence of an excessively high internal pressure inside the piston chamber, especially inside the discharge area of the pump chamber, and/or inside the pump chamber, it may be expedient for the delivery device to be adapted so as to allow medium to flow from the discharge area back into the inflow area. In particular, a partial backflow of medium may be allowed in this case when the piston moves from the extended position to the retracted position. Such a partial backflow of medium can be achieved, for example, by the presence of a clear gap between the piston and an inside wall of the piston chamber and/or the presence of at least one relief opening on the piston. It may be particularly advantageous if at least one relief opening is arranged on the piston valve. A relief opening may be formed as a notch and/or a groove, for example, which cannot be sealed or completely sealed in the closed position of the piston valve, for example.

It may be expedient for the inlet to be embodied as an axial and/or radial opening of the pipe. For example, the inlet may be embodied as an axial and/or radial bore of the pipe.

In order to prevent the second end of the pipe adhering to the bottom of the vessel under suction, according to the invention at least one separator may be formed at the second end of the pipe. At least the one separator may be formed as a support foot, for example. Alternatively or in addition to this, it may be expedient for radially running openings, in particular ducts and/or bores, to be provided at the second end of the pipe. This may also serve to prevent the second end of the pipe being sucked against a vessel bottom, since a stream of medium can be sucked into the piston chamber only laterally via the radial openings, not from below.

It may furthermore be expedient for the foot valve to be controlled at least partially through a positive control of the foot valve by the piston. It may be particularly expedient here for the foot valve to comprise a valve body having a face which is arranged obliquely to the longitudinal axis of the pipe and on which the piston or a displacement element of the piston can impinge, in such a way that the valve body can be displaced in opposition to a return force when the piston is moved from the retracted position into the extended position. The return force may be generated by a return element, for example. Here the valve body of the foot valve may be embodied as a taper key, for example.

According to the invention, furthermore, the piston may or may not be positively controlled by the piston rod. If the piston is not positively controlled by the piston rod, a pumping operation can be undertaken by the pump device irrespective of whether medium has already been sucked out of the vessel into the inflow area of the piston chamber. This may be advantageous particularly in the case of especially viscous media. Alternatively or in addition to this, it may be expedient for the piston to be movable from the extended position into the retracted position or vice-versa by a return element, in particular by a tension and/or compression spring. Such a return element therefore serves to relieve the delivery drive, thereby prolonging its service life, for example. The piston is therefore movable from the extended position into the retracted position independently of the delivery drive and/or can be moved from the retracted position into the extended position by the delivery drive, via the piston rod.

According to an especially suitable embodiment of the delivery device according to the invention the pump device may comprise a pump chamber, in which a pump piston is arranged, which by the delivery drive can be moved between an extended position and a retracted position inside the pump chamber, and the pump chamber comprises an inlet valve and an outlet valve. In particular, here, a medium contained in the pump chamber can be displaced by the pump piston through the outlet valve into a delivery line via a delivery duct when the pump piston moves from a or said retracted position to a or said extended position. According to an especially advantageous embodiment of the invention, the invention may provide for arrangement of the delivery duct inside the pump piston. For example, the delivery duct may be embodied as an axial bore or as an axial duct inside the pump piston. According to a further advantageous embodiment of the delivery device according to the invention, the inlet and/or outlet valve may be embodied as a check valve. Medium can thereby be prevented from flowing back out of the pump chamber into the piston chamber or from the delivery line into the pump chamber and/or the delivery duct. In the case of the delivery device according to the invention, moreover, a medium can be forced out of the discharge area of the piston chamber into the pump chamber when the piston moves from the extended position to the retracted position.

In an especially stable embodiment of the delivery device according to the invention a or said pump piston may be formed as a part of the piston rod or fixedly connected to the piston rod. If the pump piston is formed as part of the piston rod, a diameter of the cross section of the piston rod may suitably be wider in a pump piston portion than in a connecting portion between the pump piston and the piston.

The aforementioned advantages of the device according to the invention make it particularly suitable for embodiment as a drum pump. In particular, it may be advantageous here if the delivery drive of the delivery device can be arranged outside and/or the pipe inside a drum.

Furthermore, the invention also relates to the use of the delivery device according to the invention, as described and claimed herein, for delivering a viscous medium, such as a grease, for example. The tubular embodiment of pump device and scoop device described, in particular, allows delivery from a drum, in particular through a bung-hole.

BRIEF DESCRIPTION OF THE DRAWINGS

The invention is now described in more detail with reference to an exemplary embodiment, but is not limited to this exemplary embodiment. Further exemplary embodiments according to the invention ensue through the combination of individual or multiple features of the claims with one another and/or with individual or multiple features of the exemplary embodiments.

In the drawings.

DETAILED DESCRIPTION OF THE PREFERRED EMBODIMENTS

Figures 1, 2:
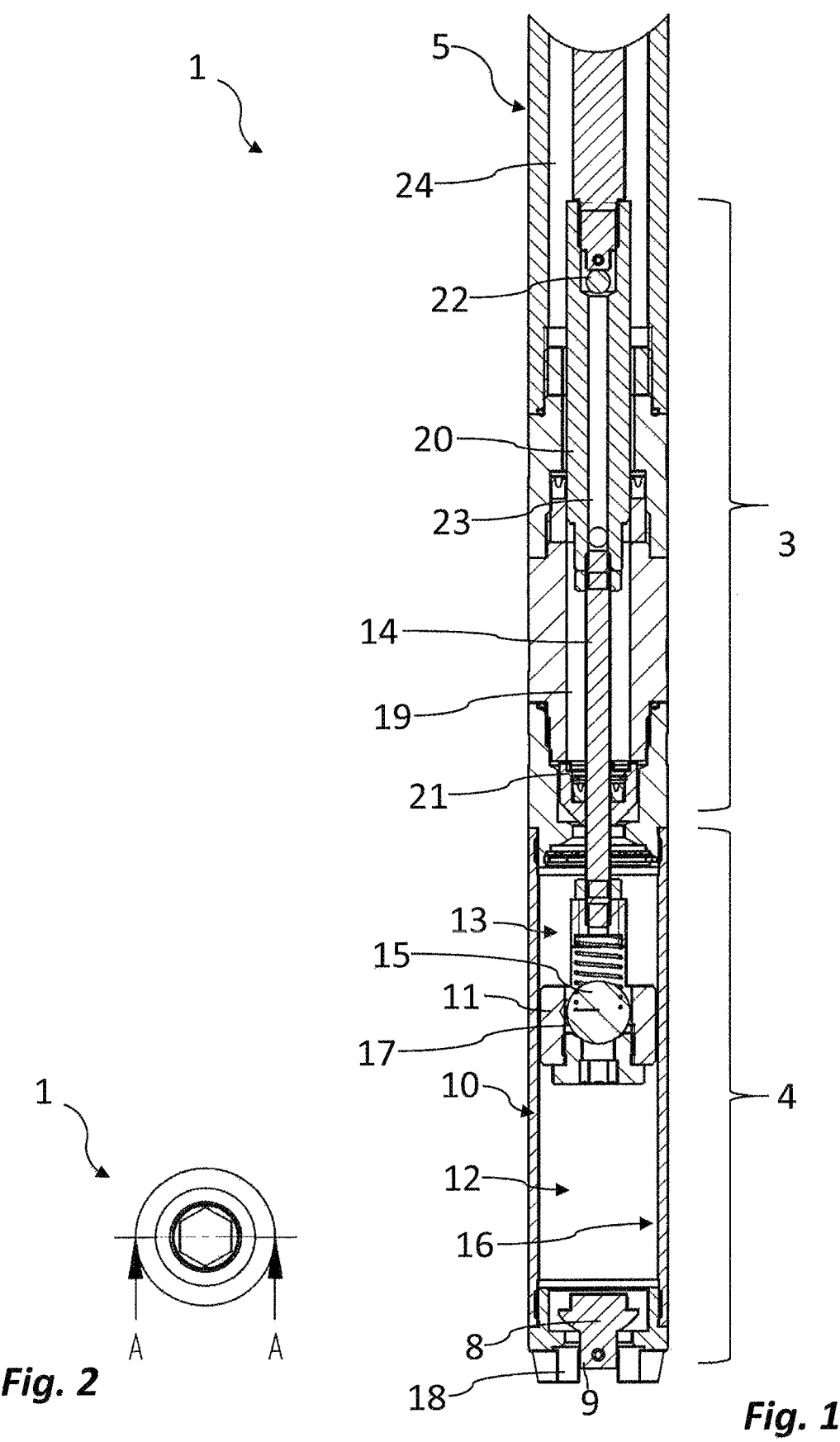
FIG. 1 shows a sectional representation of a partial area of the delivery device according to the invention with pump device and scoop device.
FIG. 2 shows a cross section through the pipe of the delivery device according to the invention.
Figure 6:
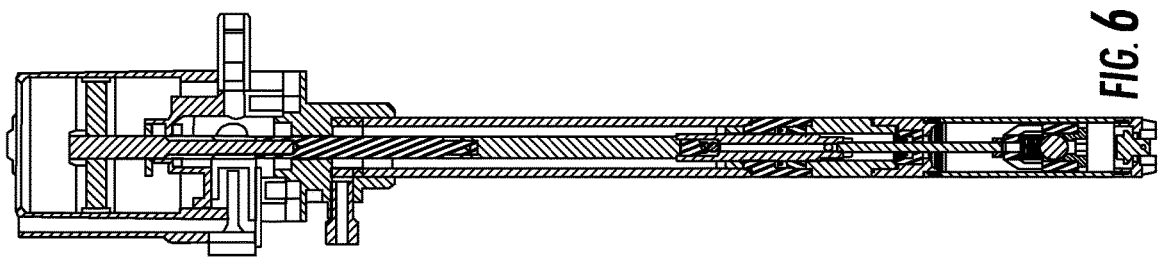
FIG. 6 shows a sectional view of one embodiment of the delivery device according to the invention according to FIG. 3 to FIG. 5, showing the piston during a movement from the retracted position to the extended position.

FIGS. 1 to 6 represent a specific exemplary embodiment of a delivery device according to the invention for delivering a fluid medium, in particular a viscous medium, such as a grease, for example, the delivery device according to the invention being denoted overall as 1.

The delivery device 1 according to the invention has a delivery drive 2, which is arranged at a first end 6 of a pipe 5. The delivery device 1 is therefore designed in such a way that during operation of the delivery device 1 the delivery drive 2 is arranged outside a vessel, such as a drum, for example, and the pipe 5 inside the vessel, in particular the drum. Here the pipe 5 may be capable of introduction into an opening of the vessel, for example, such as a bung-hole, for example.

The delivery device 1 according to the invention further comprises a pump device 3 and a scoop device 4. The pump device 3 and the scoop device 4 are arranged inside the pipe 5.

The scoop device 4 has a foot valve 8, which serves to control an inlet 9 for an inflow of medium into a piston chamber 10 of the scoop device 4. The foot valve 8 is arranged at a second end 7 of the pipe 5.

A guided, movable piston 11, which sub-divides the piston chamber 10 into an inflow area 12 and a discharge area 13, is arranged in the piston chamber 10. The inflow area 12 and the discharge area 13 can be connected via the piston 11, via a piston valve 15. The piston 11 is movably arranged inside the piston chamber 10 in such a way that it is movable between an extended position (see FIG. 3) and a retracted position (see FIG. 5).

The scoop device 4 is connected upstream of the pump device 3 in the inflow direction of the medium. Both the piston 11 of the scoop device 4 and a pump piston 20 of the pump device 3 can be move by the delivery drive 2 via a piston rod 14.

The piston valve 15 of the piston 11 is embodied as a check valve, in particular as a ball-type check valve. A direction of flow is thereby defined from the inflow area 12 into the discharge area 13 of the piston chamber 10.

The foot valve 8 of the scoop device 4 is likewise embodied as a check valve, thereby defining a direction of flow of the medium from a vessel into the inflow area 12 of the piston chamber 10.

Figure 5:
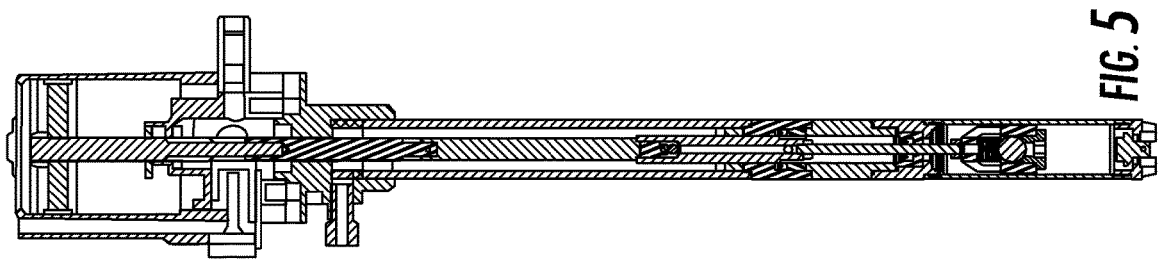
FIG. 5 shows a sectional view of the embodiment of the delivery device according to the invention in FIG. 3 and FIG. 4, with the piston situated in a retracted position.
Figure 4:
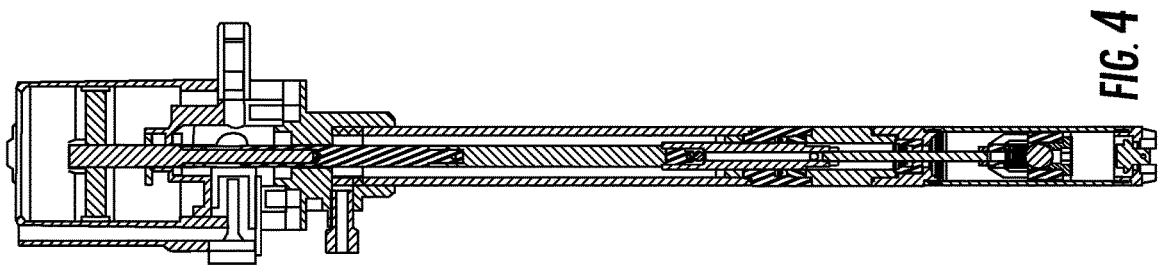
FIG. 4 shows a sectional representation of the delivery device according to the invention in FIG. 3, showing the piston during a movement from an extended position to a retracted position.
Figure 3:
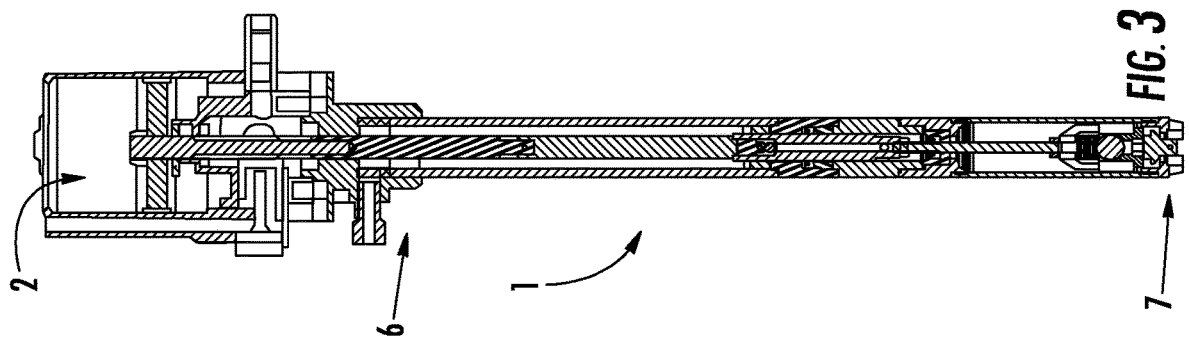
FIG. 3 shows a sectional view of one embodiment of a delivery device according to the invention, the piston being in the extended position.

FIGS. 3 to 6 represent the sequence of movements of the piston 11 and the pump piston 20 during a delivery cycle. FIG. 3 shows how the piston 11 and the pump piston 10 are situated in the extended position. If the piston 11 and the pump piston 20 are moved out of the extended position towards the retracted position by the delivery drive 2, as shown in FIG. 4, the foot valve 8 opens due to the resulting negative pressure in the inflow area 12 of the piston chamber 10. Fresh medium can thereby be sucked through the inlet 9 into the inflow area 12 via the foot valve 8. In addition, medium is forced out of the inflow area 13 into the pump chamber 19 of the pump device 3 though an inlet valve 21 of the pump chamber 19. FIG. 5 shows how the piston 11 and the pump piston 20 are situated in the retracted position. In a reverse movement of the piston 11 and the pump piston 20 from the retracted position to the extended position, the foot valve 8 and the inlet valve 21 of the pump chamber 19 are closed and medium is forced out of the inflow area 12 into the discharge area 13 of the pump chamber 10. By the pump piston 20, medium is furthermore displaced from the pump chamber 19 into an axially running delivery duct 23 inside the pump piston 20 and via the delivery duct 23 is forced through an outlet valve 22 of the pump chamber 19 into a delivery line 24 (cf. FIG. 6).

The delivery drive 2 is embodied as an oscillating drive, for example as a pneumatic motor, as represented in FIGS. 3 to 6.

A delivery capacity of the scoop device 4 is designed to be greater than a delivery capacity of the pump device 3. In order to prevent excessive pressure arising inside the delivery device 1, particularly in the piston chamber 10 and/or the pump chamber 19, which might damage the delivery device 1, the delivery device 1 is designed in such a way that medium is able to flow back from the discharge area 13 into the inflow area 12, for example when the piston 11 moves from the extended position to the retracted position. The partial backflow of the medium can be achieved, in particular, in that medium is able to flow through a gap between the piston 11 and an inside wall 16 of the piston chamber 10 and/or via at least one relief opening 17 on the piston 11. The relief opening 17 may be arranged on the piston valve 15, for example, thereby serving, for example, to prevent the piston valve 15 in the piston 11 completely closing a flow passage, so that medium can flow back via the relief opening 17 even when the piston valve 15 is in a closed position. The relief opening 17 may be embodied as a groove, for example.

The inlet 9 is formed as an axial opening of the pipe 5. Multiple separators 18 are formed at the second end 7 of the pipe 5, thereby serving to prevent the pipe 5 adhering to the bottom of a vessel under suction.

The pump device 3 comprises a pump chamber 19, in which the pump piston 20 is arranged. Here the pump piston 20 is formed as a part of the piston rod 14, which is connected to the delivery drive 2. A diameter of a cross section of the piston rod 14 is therefore greater in a pump piston portion than in a connecting portion between the pump piston 20 and the piston 11. This means, moreover, that the pump chamber 19, inside which the pump piston 20 is able to move, is formed in such a way that as a result medium present inside the pump chamber 19 can be forced into the delivery duct 23 when the pump piston 20 moves from the retracted position to the extended position.

The delivery device 1 according to the invention may be embodied as a drum pump and is therefore particularly suited to use in delivering a pasty medium, such as grease, for example.

LIST OF REFERENCE NUMERALS 1 delivery device
2 delivery drive
3 pump device
4 scoop device
5 pipe
6 first end of the pipe
7 second end of the pipe
8 foot valve
9 inlet
10 piston chamber
11 piston
12 inflow area
13 discharge area
14 piston rod
15 piston valve
16 inside wall of the piston chamber
17 relief opening
18 separator
19 pump chamber
20 pump piston
21 inlet valve of the pump chamber
22 outlet valve of the pump chamber
23 delivery duct
24 delivery line

The invention claimed is:

1. A delivery device (1) for delivering a liquid medium, comprising a delivery drive (2), a pump device (3), and a scoop device (4), the delivery drive (2) is arranged at a first end (6) of a pipe (5), the pump device (3) and the scoop device (4) are arranged inside the pipe (5), and the scoop device (4) comprises a foot valve (8), which is arranged at a second end (7) of the pipe (5) and said foot valve (8) serves to control an inlet (9) for an inflow of liquid medium into a piston chamber (10) of the scoop device, a piston (11) of the scoop device arranged in the piston chamber (10), the piston sub-divides the piston chamber (10) into an inflow area (12) and a discharge area (13), the inflow area (12) and the discharge area (13) are connectable via the piston (11), the piston (11) is movable via a piston rod (14) between a retracted position and an extended position inside the piston chamber (10) by the delivery drive (2) such that the liquid medium is adapted to be sucked into the piston chamber (10) by a movement of the piston (11) into the retracted position while the liquid medium in the discharge area (13) is displaced into a pump chamber (19) of the pump device (3), and the liquid medium is adapted to be displaced into the discharge area (13) of the piston chamber for delivery to the pump device (3) as the piston (11) moves into the extended position, the scoop device (4) is connected upstream of the pump device (3) in an inflow direction of the liquid medium, and the pump device (3) comprises the pump chamber (19), in which a pump piston (20) is arranged, which by the delivery drive (2) is movable between an extended position and a retracted position inside the pump chamber (19), the pump chamber (19) comprises an inlet valve (21) and an outlet valve (22), and the liquid medium contained in the pump chamber (19) is displaceable by the pump piston (20) through the outlet valve (22) into a delivery line (24) via a delivery duct (23) when the pump piston (20) moves from the retracted position to the extended position, a delivery capacity of the scoop device (4) is greater than a delivery capacity of the pump device (3), and the delivery device allows the liquid medium to flow back to the inflow area when the piston (11) moves from the extended position to the retracted position by allowing a backflow of liquid medium via at least one relief opening (17) on the piston valve (15), and the piston (11), the piston rod (14), the pump piston (20), the inlet valve (21), the outlet valve (22), and the foot valve (8) are arranged coaxially in the pipe (5).

2. The delivery device (1) as claimed in claim 1, wherein the piston (11) comprises a piston valve (15), by way of which the inflow area (12) and the discharge area (13) of the piston chamber (10) are connectable, the piston valve (15) is embodied as a check valve thereby defining a direction of flow from the inflow area (12) into the discharge area (13) of the piston chamber (10).

3. The delivery device (1) as claimed in claim 1, wherein the delivery device (1) is configured such that the foot valve (8) is open or opened and fresh liquid medium is drawn into the inflow area (12) by the foot valve (8), and liquid medium is forced out of the discharge area (13) into the pump device (3), when the piston (11) moves from the extended position to the retracted position.

4. The delivery device (1) as claimed in claim 1, wherein the delivery drive (2) is embodied as an oscillating drive.

5. The delivery device (1) as claimed in claim 1, wherein the inlet (9) is embodied as at least one of an axial or radial opening of the pipe (5).

6. The delivery device (1) as claimed in claim 1, wherein the foot valve (8) is controlled at least partially through a positive control of the foot valve (8) by the piston (11), and the foot valve (8) comprises a valve body having a face which is arranged obliquely to a longitudinal axis of the pipe (5) and on which the piston (11) or a displacement element of the piston (11) impinges, in such a way that the valve body is displaceable in opposition to a return force within the foot valve (8), which is generated, when the piston (11) is moved from the retracted position into the extended position.

7. The delivery device (1) as claimed in claim 1, wherein the piston (11) is positively controlled by the piston rod (14).

8. The delivery device (1) as claimed in claim 1, the pump piston (20) is formed as a part of the piston rod (14) or fixedly connected thereto, and a diameter of a cross section of the piston rod (14) is wider in a pump piston portion than in a connecting portion between the pump piston (20) and the piston (11).

9. The delivery device as claimed in claim 1, wherein at least one of the piston (11) of the scoop device (4) or the pump piston (20) of the pump device (3) is movable by the delivery drive (2) via the piston rod (14).

10. The delivery device as claimed in claim 1, wherein the foot valve (8) is embodied as a check valve, thereby defining a direction of flow into the inflow area (12) of the piston chamber (10).

11. The delivery device (1) as claimed in claim 1, wherein the foot valve (8) is closed and liquid medium is forced out of the inflow area (12) into the discharge area (13), when the piston (11) moves from the retracted position to the extended position.

12. The delivery device (1) as claimed in claim 1, wherein at least one separator (18) is formed at the second end (7) of the pipe (5).

\* \* \* \* \*